Feb. 14, 1939.  A. J. SCHOLTES  2,147,355
PERMANENT HOSE COUPLING
Filed June 29, 1938
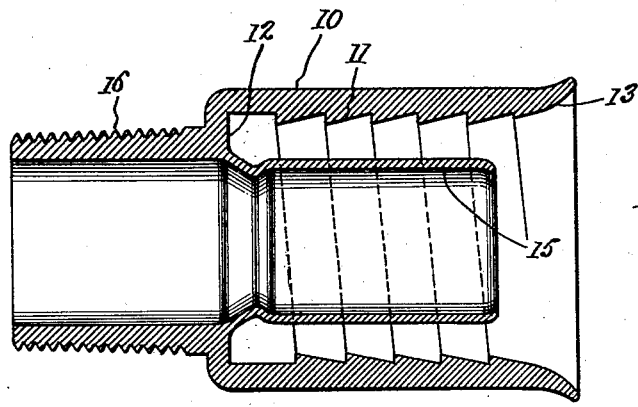
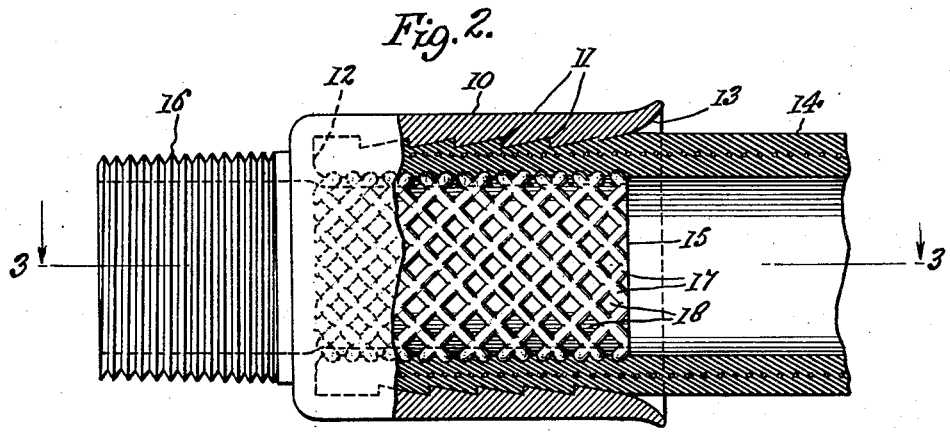
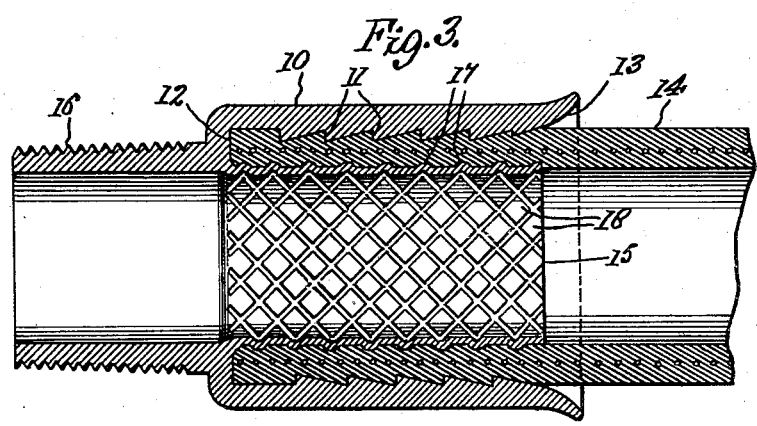
Inventor
Albert J. Scholtes
By Mawhinney & Mawhinney
Attorneys.

Patented Feb. 14, 1939

2,147,355

UNITED STATES PATENT OFFICE 2,147,355

PERMANENT HOSE COUPLING

Albert J. Scholtes, Baltimore, Md.

Application June 29, 1938, Serial No. 216,574

2 Claims. (Cl. 285—84)

The present invention relates to hose couplings, and more particularly to a coupling of the permanent type for securing and sealing a coupling member upon the end of a hose.

An object of the present invention is to provide a coupling wherein the coupling member and the hose, a pipe or the like, are deformed complementary to each other so as to provide a permanent interlock for securing the coupling member on the end of the hose and prevent the pulling out of the hose from the coupling member and the sealing of the end of the hose in the coupling member.

Another object of the present invention is to provide a permanent hose coupling of this type wherein the coupling member may be constructed in one piece with its inner and outer portions to receive the end of a hose therebetween, and wherein the inner member of the coupling is deformed and provided with raised circumferentially angular portions which are embedded within the inner wall of the hose, and wherein the outer part of the coupling has projections or threads which are embedded in the outer surface portion of the hose so that the hose end is compressed and deformed between the coupling members to securely seal and anchor the hose end in the coupling.

Another object of the invention is to provide a permanent hose coupling embodying the above characteristics and which is provided with helical ribs and opposed threads or projections within the coupling member which may be produced by the tool forming the subject matter of my copending application filed of even date herewith.

A further object of the invention is to provide a coupling member with inner and outer parts, the inner part of which initially is provided with a smooth outer surface to simplify manufacture and which in finished form is expanded and helically beaded to compress the hose and interlock therewith.

With the foregoing and other objects in view, the invention will be more fully described hereinafter, and will be more particularly pointed out in the claims appended hereto.

In the drawing, wherein like symbols refer to like or corresponding parts throughout the several views:

Figure 1 is a detail longitudinal section taken through a coupling member ready to be applied to the end of a hose.

Figure 2 is a side elevation, partly in section of the hose coupling, showing the hose and the coupling member interfitted and deformed to secure the hose and the coupling member together and with the hose end deformed and sealed in the coupling, and Figure 3 is a longitudinal central section taken on the line 3—3 of Figure 2 through the improved hose coupling.

Referring now to the drawing, and first to Figure 1, the coupling comprises a coupling member which may be constructed of one piece, or otherwise, having an outer sleeve portion 10 which may be provided with internal threads or other projections 11 if desired, and which, as shown, are in the form of buttress threads having their shoulders directed toward the inner end of the sleeve 10 and facing an end shoulder 12. The outer end of the sleeve 10 is preferably provided with a flaring inner wall 13 to admit the easy introduction of the extremity of the hose 14 and which also provides a rounded bell shape surface protecting the hose against cutting during the handling of the same.

The coupling member is also provided with an inner part or nipple 15 which extends within the sleeve 10 from the inner margin of the shoulder 12 and provides, with the sleeve 10, an annular space for the reception of the end of the hose 14. The inner or closed end of the sleeve 10 is provided with a connecting portion 16 of suitable construction adapted to receive a nozzle, a complementary coupling member or the like. Initially, the nipple 15 is of less diameter than the internal diameter of the shoulder 12 to admit the relatively free passage of the hose end 14 into the coupling prior to the deforming of the parts for interlocking the hose to the coupling. As shown in Figures 2 and 3, the inner part or nipple 15, after the hose end has been forced into the sleeve 10 about the nipple 15, is expanded and deformed to provide anchoring ribs 17 which are embeded in the inner surface portion of the hose 14, and which together with the expansion of the nipple 15, compress and deform the hose end into the projections or threads 11 of the sleeve 10 so that the hose end is compressed radially and caused to expand axially and thus bind against the shoulder 12 of the coupling member for firmly sealing the extremity of the hose thereagainst.

The raised beads or projections 17 may be of any suitable character and are preferably spaced apart and in intersecting relation to provide peripheral angular projections for effectively anchoring and holding the hose end in the coupling. This may be accomplished by the construction shown in Figures 2 and 3 wherein the raised beads or projections 17 are in the form of helical ribs provided by corrugating the nipple 15 outwardly at spaced points and in helical ridges suitably spaced apart and extending continuously throughout the nipple 15 from end to end. These helical ridges may be disposed in opposite directions so that they intersect upon the outer surface of the nipple 15 and provide diamond shaped depressions 18 which receive spaced portions of the inner wall of the hose 14 for effectively holding the same against axial and rotational strains. There is thus provided a large number of spaced apart diamond shaped depressions 18 which receive portions of the inner wall of the hose 14 to compress the latter and also to deform the hose in compressed relation into the buttress threads or projections 11 of the sleeve 10. The sleeve 10 is given desired thickness and stability to withstand internal pressures incident to the construction or formation of the hose coupling while the nipple 11 is of such thickness and quality that it may be readily deformed or corrugated to provide the projections 17.

The hose end 14 thus provides one member of the permanent hose coupling and is permanently deformed and compressed between the inner and outer parts 15 and 10 of the coupling member so that the latter is permanently secured to the hose and serves as a means by which the hose may be secured to a nozzle or another hose coupling.

What is claimed is:

1. A hose coupling comprising a coupling member having an outer sleeve with threads in its inner wall and an abutment shoulder at its inner end, a hose end fitting in said sleeve against said shoulder and receiving said threads in its outer surface portion, and an expanded inner part carried by the sleeve and extending from the shoulder thereof in spaced relation to the sleeve and fitting within said hose, said inner part having helical raised ridges formed during the expanding process and extending in a direction opposite to that of the threads of the outer sleeve and embedded in the inner wall of the hose for maintaining the same in compressed and deformed relation between the inner and outer parts of the coupling member.

2. A hose coupling, comprising a coupling member having a nipple and a sleeve spaced about the nipple, and a hose end fitted over the nipple in said space between the nipple and sleeve, said nipple having helical ridges on its outer surface formed during the expanding process and embedded in the inner wall portion of the hose end compressing the latter in the sleeve and cooperating therewith to secure the hose end in the coupling member.

ALBERT J. SCHOLTES.